US 6,535,269 B2

(12) United States Patent
Sherman et al.

(10) Patent No.: US 6,535,269 B2
(45) Date of Patent: Mar. 18, 2003

(54) VIDEO KARAOKE SYSTEM AND METHOD OF USE

(76) Inventors: Gary Sherman, 11075 Santa Monica Blvd. #150, Los Angeles, CA (US) 90025; Michael Chase, 1263 Westwood Blvd., Suite 200, Los Angeles, CA (US) 90077

( * ) Notice: Subject to any disclaimer, the term of this patent is extended or adjusted under 35 U.S.C. 154(b) by 0 days.

(21) Appl. No.: 09/896,420

(22) Filed: Jun. 29, 2001

(65) Prior Publication Data

US 2002/0051119 A1 May 2, 2002

Related U.S. Application Data

(60) Provisional application No. 60/215,513, filed on Jun. 30, 2000.

(51) Int. Cl.⁷ ................................................ G03B 31/00
(52) U.S. Cl. ....................................... 352/6; 434/307 A
(58) Field of Search .................... 352/6, 11; 434/307 A (56) References Cited

U.S. PATENT DOCUMENTS

| 5,341,253 A | * | 8/1994 | Liao et al. ..................... 360/13 |
| 5,880,788 A | * | 3/1999 | Bregler ........................ 345/473 |
| 6,134,526 A | * | 10/2000 | Kim ............................. 434/156 |
| 6,386,985 B1 | * | 5/2002 | Rackham ...................... 472/75 |

* cited by examiner

*Primary Examiner*—Russell Adams
*Assistant Examiner*—D. Ben Esplin
(74) *Attorney, Agent, or Firm*—Irell & Manella LLP (57) ABSTRACT

Method and system for customizing a motion film selection by selecting a film clip including a video track and a sound track comprising one or more actor voice tracks and a background track, modifying the sound track to remove a selected actor voice track, recording a new voice track for synchronized playback with the selected actor, and saving a new sound track including the modified sound track and the new voice track.

45 Claims, 8 Drawing Sheets

VIDEO KARAOKE SYSTEM AND METHOD OF USE

RELATED APPLICATIONS

This application claims the priority of provisional application Serial No. 60/215,513, filed Jun. 30, 2000.

BACKGROUND OF THE INVENTION

The present invention relates to video Karaoke systems, and more particularly to Karaoke systems that allow dubbing an actor's voice in a video clip.

SUMMARY OF THE INVENTION

In one aspect, the present invention provides a method for customizing a motion film selection comprising selecting a film clip including a video track and a sound track comprising one or more actor voice tracks and a background track, modifying the sound track to remove a selected actor voice track, recording a new voice track for synchronized playback with the selected actor, and saving a new sound track including the modified sound track and the new voice track.

In a further aspect of the present invention, a method is provided for customizing a motion film selection comprising selecting a film clip including a video track and an original sound track comprising one or more actor voice tracks and a background track, selecting a modified sound track comprising the original sound track with a selected actor voice track removed therefrom, recording a new voice track for synchronized playback with the selected actor, and saving a new sound track including the modified sound track and the new voice track.

In a yet further aspect, the present invention provides a method to enable customizing a motion film selection comprising providing a film clip including a video track and an original sound track comprising one or more actor voice tracks and a background track, providing a modified sound track comprising the original sound track with a selected actor voice track removed therefrom, and providing a system for recording a new voice track for synchronized playback with the selected actor, the system further for saving a new sound track including the modified sound track and the new voice track.

In further aspects of the invention, the invention includes playing the video track together with the new sound track to synchronize the new voice track in the new sound track with the selected actor in the video track. The invention may also include producing a new film clip by saving the video track together with the new soundtrack, playing the new film clip, and distributing the new film clip for playback. According to the invention, recording a new voice track may include recording a new voice track that is the same as the selected actor voice track or recording a new voice track that is different from the selected actor voice track.

The invention additionally provides systems to implement the methods described above. The invention also provides a system for dubbing the voice of a user over the voice of an actor or actors in a selected movie clip by replacing the voice of the actor or actors while retaining the background music score and sound effects of the original movie clip.

In another aspect, the present invention provides a method for customizing the soundtrack of a video clip for various entertainment, educational, therapeutic, and other uses.

In yet another aspect, the invention provides a method for enhancing electronic greetings, invitations, and other types of electronic messages such as e-mail, and thus the desirability and marketability of such services to the general public.

DETAILED DESCRIPTION OF THE INVENTION

Figure 1:
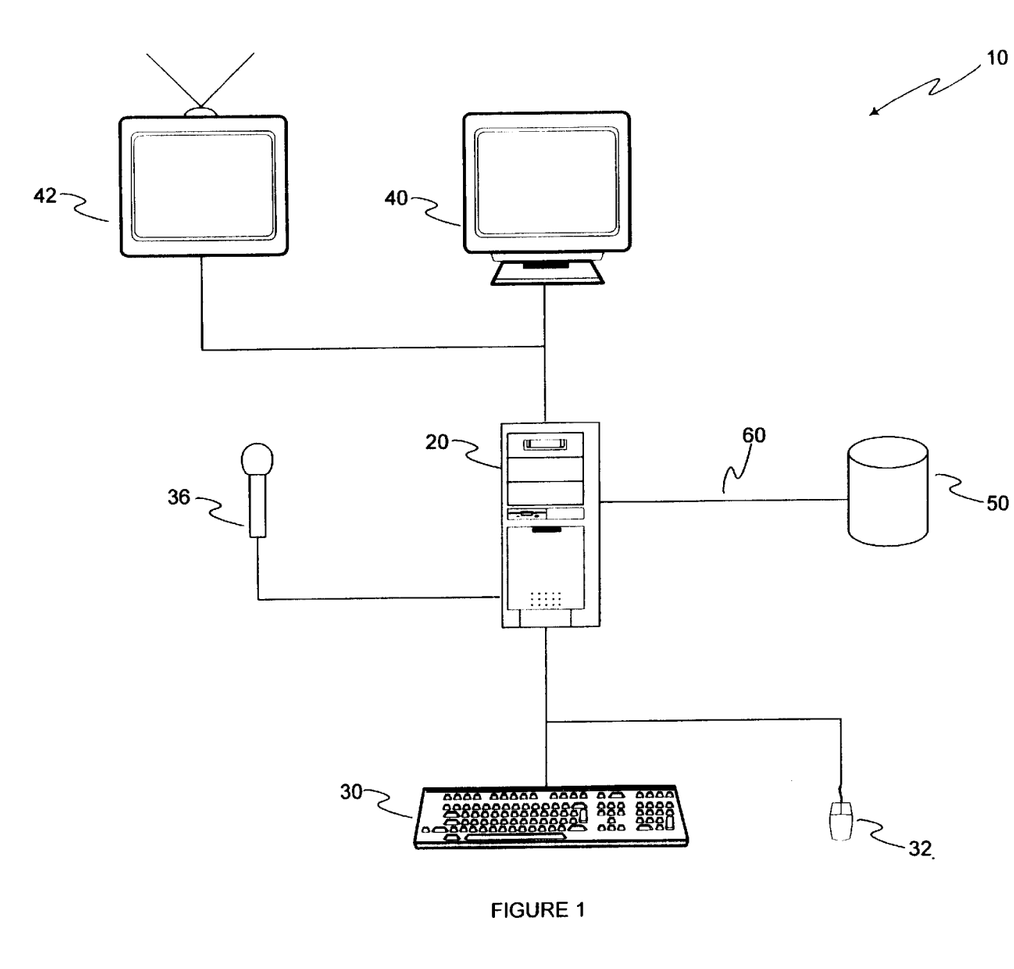
FIG. 1 is a diagram of a system according to the invention.

With reference to FIG. 1, in one aspect the present invention provides a system 10 for replacing the voice of an actor in the soundtrack of a selected movie clip with the voice of a user, and playing the movie clip with the modified soundtrack. In one preferred embodiment shown in the FIG. the system 10 of the present invention comprises, generally, a computer 20 with associated user command/selection input devices such as a keyboard 30 and/or a mouse 32, a touch screen, a remote control, as well as audio input devices such as a microphone 36. The computer 20 is further connected to at least one video output device such as a typical computer monitor 40, as well as audio output devices such as speakers [not shown]. The computer may also be connected to a typical TV set for playing the modified movie clip. A user sound input device such as a microphone 36 is also connected to the computer. The system 10 additionally comprises at least one storage device such as a hard drive 50 and/or a CD-ROM drive, CDR, CD/RW, DVD, and/or other removable storage devices. The storage device may be physically connected to the computer 20 as is the case with typical hard drives, or may be accessible through a communication link 60 (e.g. a modem, local area network, wide area network, or storage area network) as is the case where the storage device is remotely located, such as a server accessible through the Internet, an intranet, via a dial-up connection, DSL, satellite, fiber optic lines, wireless networks, etc.

In addition to being connected to the storage device 50 to retrieve a movie clip for modification by the user, the computer 20 will also run the software that enables the various functions of the system of the present invention. In a particular preferred embodiment, the software of the invention may perform the functions described below, which are described in the order in which a user is likely to initiate them while using the system 10 of the invention.

Figure 2:
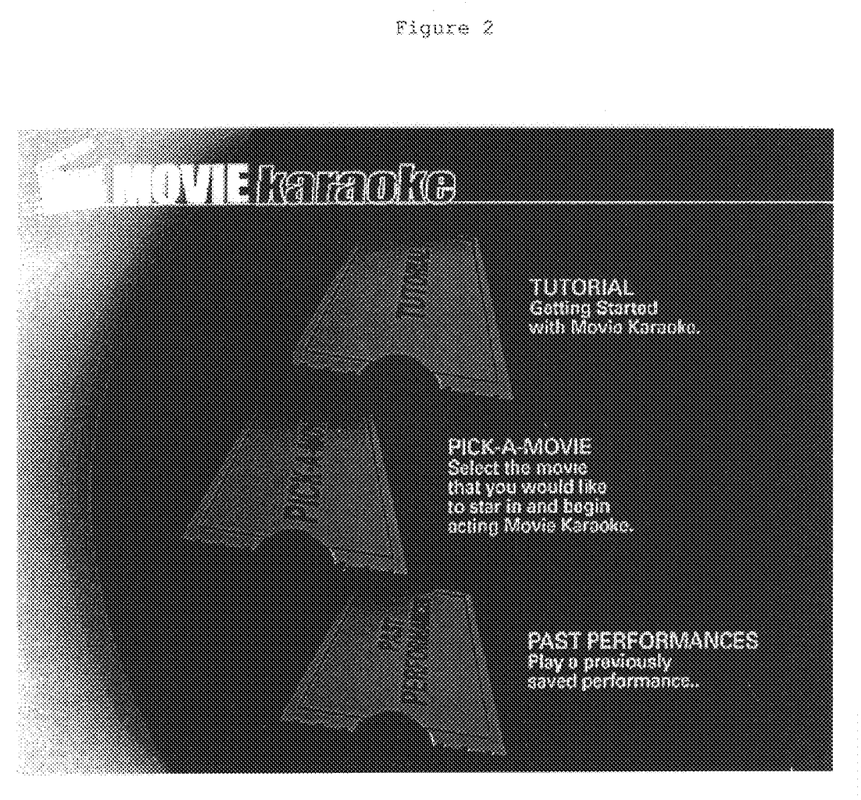
FIGS. 2-8 represent screens that may be displayed to a user of a video karaoke system according to the invention.
Figure 3:
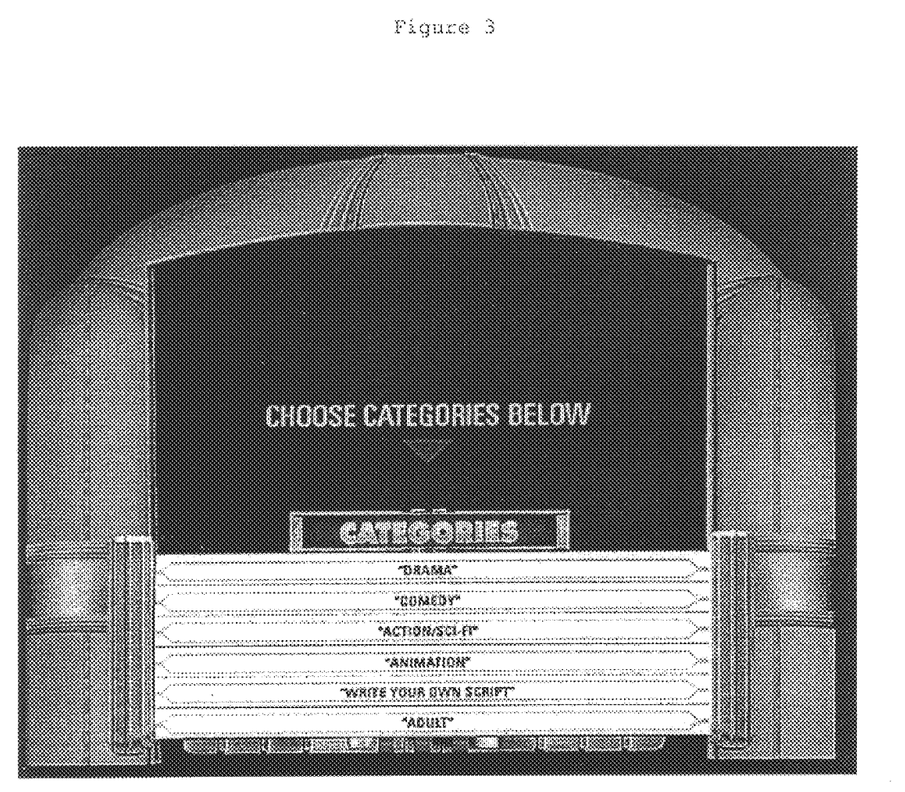
Figure 4:
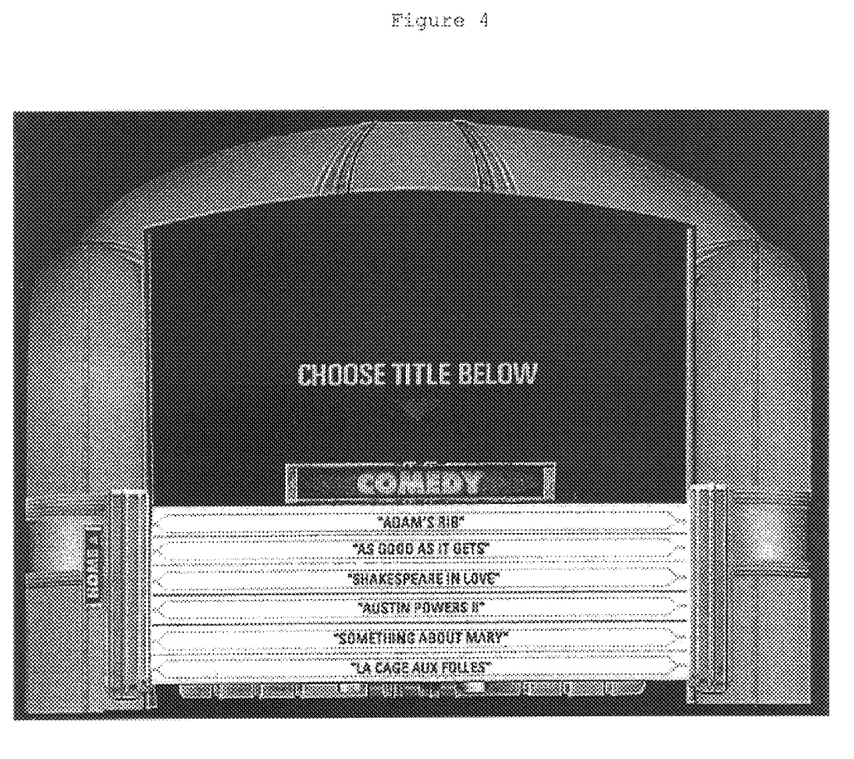
Figure 5:
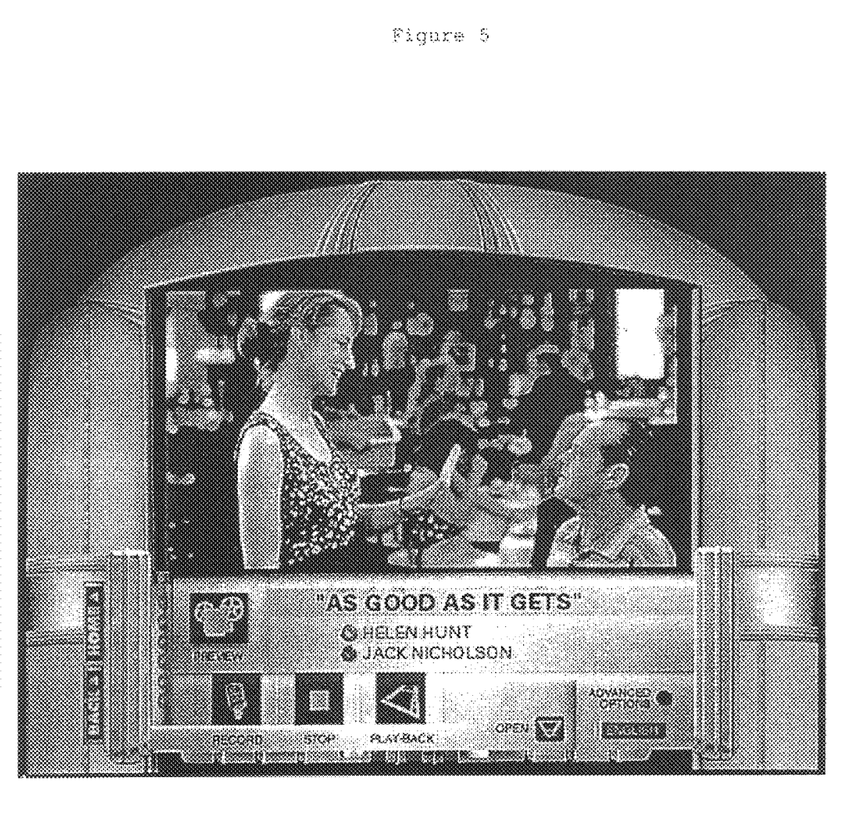

The software may operate by displaying successive screens to the user on the computer monitor 40, wherein each screen contains a number of different choices among which the user must select one. Thus, in one preferred embodiment as illustrated by FIG. 2, an initial screen will present the user with the option of selecting a movie for a new recording, playing a previously recorded performance, or reviewing help topics. Upon choosing to make a new recording, the next screen as shown in FIG. 3 will display a list of types of movies clips available, such as comedy, drama, action/adventure, science fiction, etc. Upon choosing one of these categories via the input devices 30 or 32, the following screen may present available movie clips belonging to the selected category, as shown in FIG. 4. As seen in FIG. 5, after selecting a particular clip the user may next be presented with the option of previewing the clip or recording over one or more actors' voices. Previewing the clip will simply entail playing the clip on the monitor, or alternatively on the TV set, to allow the user to familiarize himself with the actors in the clip and the actors' lines (with or without captions), and to help the user decide which actor(s) to select. The video clips may be stored in any preferred format, including but not limited to the MPEG, AVI, Windows Media, QuickTime, or Real Video format. In an alternative embodiment, the software will also allow users to provide their own video, such as from their own DVDs or camcorder clips, and to review the video clips to select a portion to revoice.

Figure 6:
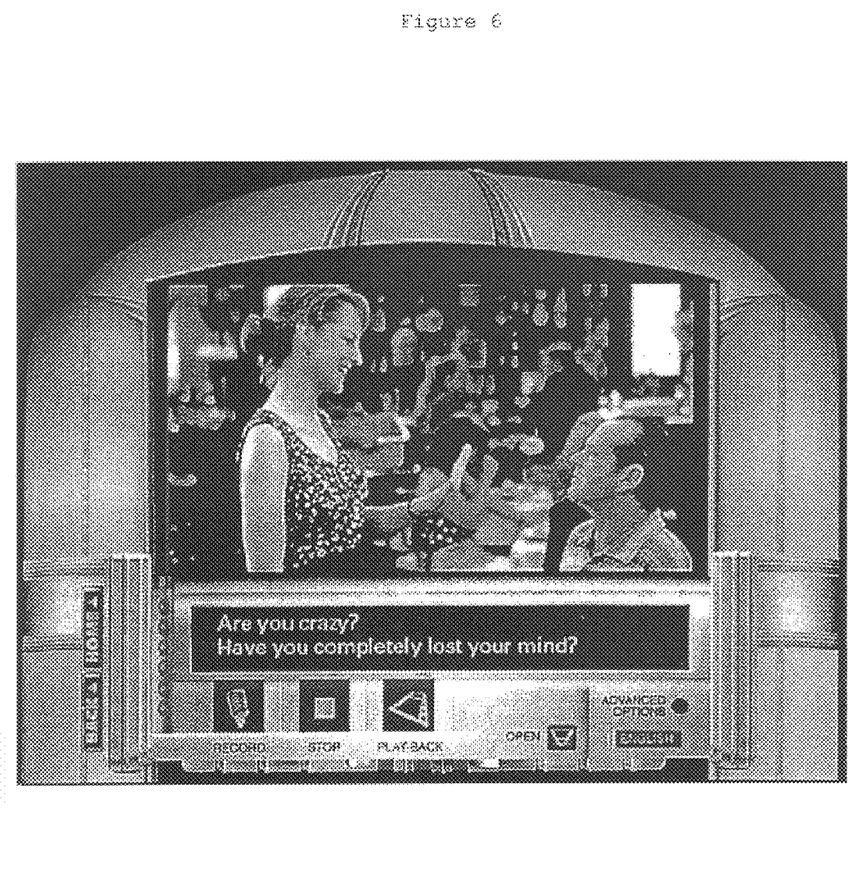

With continued reference to FIG. 5, another option may allow the user to record over an actor's voice. A screen will first identify the actors in the selected movie clip, and offer a list of those actors over which the user may record his or her own voice. The user will then select one or more actors, and will next proceed to record mode. If multiple audio input devices are available, the system will allow the user to assign which actor's lines will be replaced by which input device, thus allowing multiple users to record the same scene simultaneously. In record mode, the software will play the video image of the selected movie clip along with the background sounds, the music score, and the voices of all the actors except the actor(s) selected by the user for voice-over. As the selected actor delivers his or her lines in the movie, the actor's voice(s) are muted. Optionally, as illustrated in FIG. 6, the actor's lines are also displayed as text onto the monitor 40. Each sentence spoken by the selected actor preferably is preceded by cueing beeps to alert the user. As the selected actor delivers his or her lines, each word spoken by the selected actor may optionally also be highlighted across the screen as it is being spoken by the actor. This feature helps the user synchronize his voice with the voice of the selected actor, and thus results in a more "natural" end product as the voice of the user is better synchronized with the lips of the selected actor. Additional caption notations such as emphasis/softness can be added to enhance the recording.

As the selected actor's words are optionally displayed and highlighted across the monitor, the microphone 36 is activated and records the user's voice as the user speaks the selected actor's lines in synchronization with the selected actor. Of course, the user may choose to speak different words than those of the selected actor, thereby in effect editing the movie scene to the user's liking. By optionally displaying the selected actor's lines and highlighting the words as they are delivered, the user is aided in synchronizing his new words to the selected actor's lips if he so desires, thus enhancing the illusion that the actor is actually delivering the user's lines.

Once the user has finished recording over the selected actor's voice, the system software offers the option of previewing the clip with the modified soundtrack, i.e. with the selected actor's voice replaced by the user's voice, or the option of saving a new version of the clip with the modified soundtrack. At this point the user may also choose to select one of the other available actors and replace that actor's voice, or to re-record over the voice of the originally selected actor.

While recording over the voices of additional actors, the user may choose to hear the original voices of all other actors, or may opt to hear the modified soundtrack with the previously selected actors' voices dubbed over. Alternatively, the user may select to hear the original voice of some actors and the dubbed voices of other actors. In a preferred embodiment, the system software saves the voice of each actor in a separate, digitally encoded audio file (such as in a WAV or MP3 format file), and thus allows the user complete flexibility in choosing the desired audio track for each actor. Thus, when the user chooses to save a modified soundtrack, the system software in essence saves an audio file containing the user's voice for replacing an actor's original voice audio file during playback of the movie clip.

The user can repeat the recording steps for all available actors in the selected clip until the user is satisfied with the results, at which time the movie clip may be displayed full screen together with the modified soundtrack comprised of the individual sound files for each actor, each actor dubbed over by the user, the background sounds, and the music score. The modified movie clip may be displayed on the computer monitor 40 or an optional TV set 42 connected to the computer 40 running the system software of the present invention.

Figure 7:
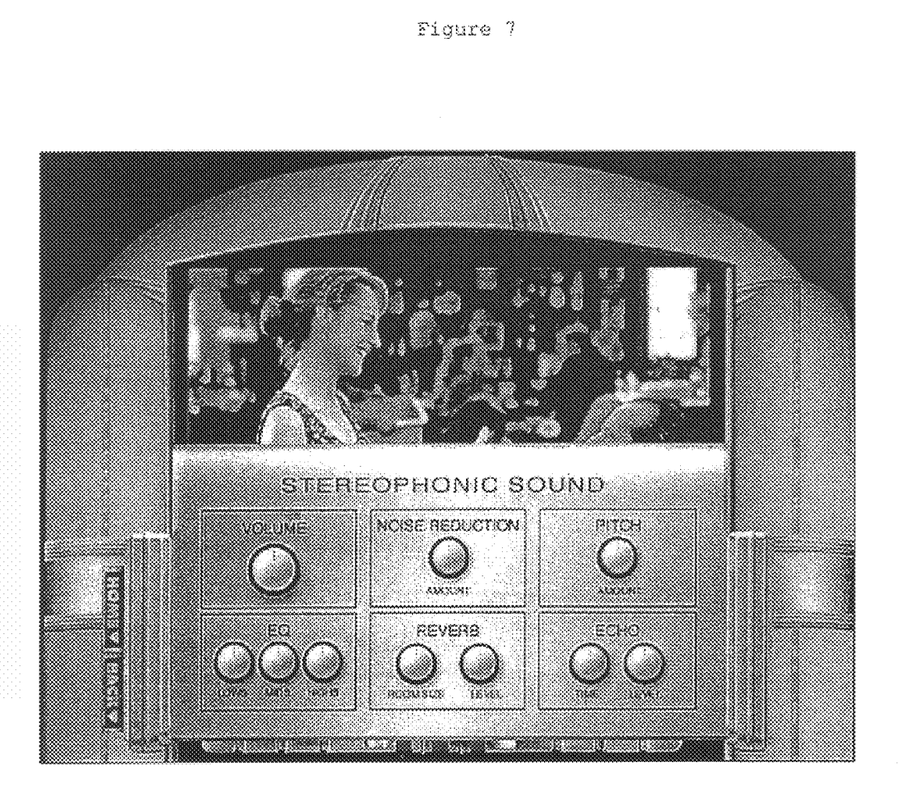
Figure 8:
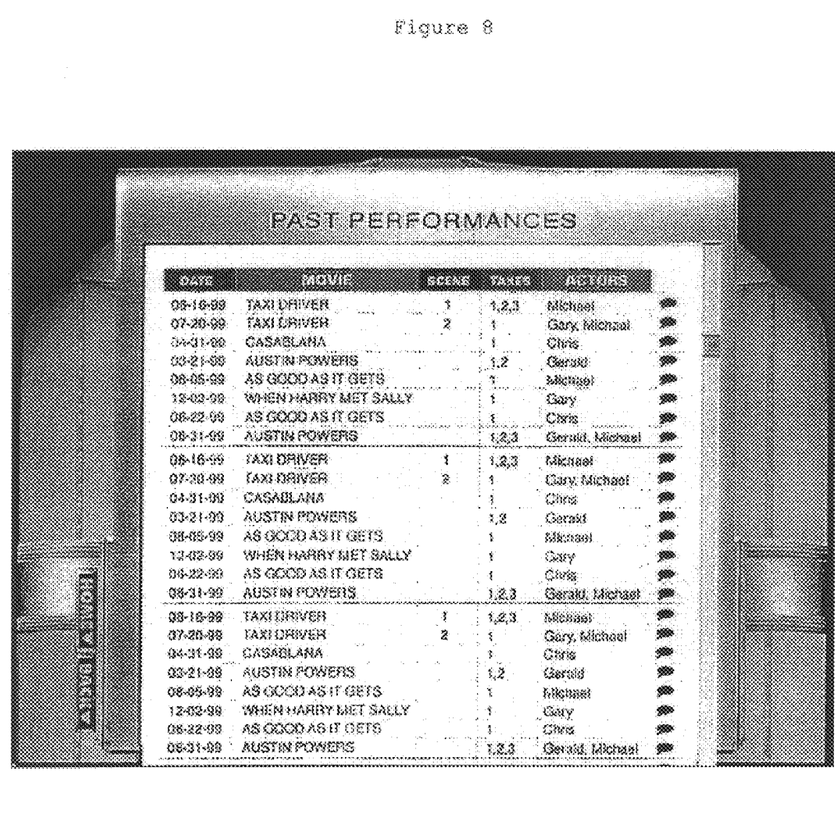

In a preferred embodiment, the system software of the present invention offers additional features and options. Basic features such as microphone sensitivity, volume, brightness/contrast are provided. Noise-canceling features that record ambient noises and cancel them are used to improve audio quality. A desirable feature may include the ability to adjust the properties of each audio file, including but not limited to volume, pitch, tone, echo, and noise filtering, as shown in FIG. 7. A sound analysis plug-in system adhering to current standards will allow users to add from a large collection of existing filters or custom ones. In this manner, the user may adjust his recorded voice to more closely match the voices of the other actors in a selected movie clip, and thus enhance the overall quality of the modified soundtrack by blending the modified voices with the original voices and the music score. Additional features may be provided to automatically adjust the recorded tracks with the original by "audio morphing" the recorded tracks to (variably) match the original. Static elements such as volume, amount of echo, can be automatically adjusted. Furthermore, timing can be analyzed for pauses and individual vowels and then shifted, stretched or compressed to match the original, further enhancing the realism of the user speaking the original lines. Similarly, spectral changes can be applied or enhanced automatically to seamlessly immerse the user in the scene. The amount of "assistance" is user-selectable, or in a possible game scenario, reduced as the level of difficulty increases. Also, the degree of assistance needed can be used to determine the score. As shown in FIG. 8, the user may choose to save any such modified, or adjusted, audio files as separate files in addition to the original replacement audio file, and may thus choose to create multiple versions of a single 'take'. In this manner the user will be afforded the ability to compare the various versions and thus select a preferred version. Comparing the various versions may be further aided by the use of a sound analyzer, as described below.

Another desirable feature may be a sound analyzer that will display the waveform and spectral analysis of a selected audio file, or optionally display and contrast the waveforms of two or more selected audio files. In this manner, the user may compare his voice with the original voice of the selected actor, and compare his timing, inflection, and volume against the original actor's voice. This feature may also be useful for aspiring actors practicing their delivery, or alternatively for an user attempting to learn a foreign language by dubbing over a soundtrack in foreign language and using the system of the present invention to review and critique his progress. Additionally, the system may be used in speech therapy, such as to teach the deaf or hearing impaired to speak by allowing them to dub over an actor's voice as they watch the actor's lips move and concurrently read the highlighted words, and subsequently to visually review their performance by comparing their voice with that of the actor through the sound analyzer waveforms.

The sound analyzer may also be able to assign a numerical score or grade to a user's recording based upon the degree to which the user was able to match the original actor's voice. The score may be based upon a mathematical analysis of the differences between the two waveforms in terms of synchronization, volume, voice pitch, etc. The user optionally may be allowed to select the parameters upon which the score is based, thereby allowing the user to tailor the scoring tool of the sound analyzer to his particular desired use. Thus, the system of the invention may be used as an entertainment tool that allows various users to compete against one another in trying to dub over (or imitate?) an actor's voice. Alternatively, therapy or educational users of the system may assess their progress by keeping track of their scores.

Another option available to the user may be to save the movie clip together with any one or more of the modified voice tracks and the original music score and background track as a standard video file, such as in MPEG, AVI, Windows Media, QuickTime, or Real Video format. In this manner, the user may distribute the modified movie clip to friends and others via any available distribution medium, including either via e-mail or on a disc, tape, or cd. This feature thus opens many other possibilities for use of the present invention, as more fully discussed below.

Yet another option that may be offered by the system software of the invention is editing the visual elements of the movie clip. Users can select photographs to be superimposed/inserted into the video, thus inserting themselves into the scene. Another possibility is to segment out the static background of a scene and replace it with another background or even video, thus completely altering the context of the video. In one embodiment, the computer 20 may additionally be connected to a video camera [not shown] that will capture either still images of the user, or optionally capture a video file of the user's head as he speaks the selected actor's lines. The software may embody functions that will replace the head of the selected actor with the videotaped image of the user's head, thus in essence completely replacing the selected actor from the clip with the user. Optionally, a 'canned' or pre-recorded video source may be used to provide images to replace a selected actor, such a video tape, video disc, DVD, or a video computer file in any desired format, such as MPEG, AVI, Windows Media, QuickTime, or Real Video. A more sophisticated setup can be used to scan the 3-D structure of a user's face or entire body, and using 3-D rendering techniques, generate arbitrary movements of the user's virtual self and insert or overlay them onto the scene. The actions of the virtual characters can be animated via several methods. Pre-recorded/pre-programmed motion sequences of the original actors can be provided so their original actions can be mimicked exactly. However, the user can choose to animate their virtual self by specifying the motions manually, or in a sophisticated setting, use motion-capture technology to automatically convert the user's motions onto the screen. If desired, their motions can be judged by how closely they resemble the original, in addition to scoring the revoicing.

As previously mentioned, the invention may be used for educational purposes, such as learning a foreign language. In this method of use of the invention, movie clips in the desired foreign language are made available along with the appropriate text for each actor's lines. The user thus speaks along with a selected actor in the foreign language while watching the actor's lips and reading along with the highlighted words, thereby practicing not only his vocabulary but also the proper inflection and timing. As discussed elsewhere in the specification, an audio analyzer may be provided to display a visual indication of the match between the user's voice and the original actor's voice, thus further aiding the user.

Similarly, the system software may be used to teach young children or the learning impaired simple concepts such as, among others, object recognition. In one embodiment, a movie clip may be prepared wherein an actor points to various objects and concurrently pronounces each object's name. A child viewing the movie clip would repeat the name of each object while viewing the name of the object on the screen. In this manner, the child would expand her vocabulary while learning to read, or recognize letters, in an entertaining and amusing manner afforded by the ability to hear her own voice played along with the movie clip.

As discussed above, in one embodiment of the invention each movie clip is comprised of a video file, individual audio files for each actor, background, and music, and multiple text files for each individual actor's audio file. In one method of preparing these files, a typical video file such as a MPEG file of the desired movie clip is used to obtain the respective individual files listed above. Each individual actor's audio file is prepared by analyzing the actor's voice and then subtracting that particular frequency range from the original soundtrack to obtain the particular actor's voice. When all actors' voices have been subtracted out and saved in individual files, the remaining soundtrack comprises the background and music score. (Not this easy . . . )

In an alternative approach, the movie clip may be prepared for use with the invention from the very beginning, by recording each actor's voice independently of the other actors, the background, and the music score. Professionally produced films and features are typically produced in this manner, and thus one method of preparing movie clips for use with the invention is to use the original studio video and audio recordings to prepare the various individual audio tracks. Additionally, audio tracks on consumer video formats are encoded in multiple channels, such as Dolby Surround, Dolby Digital, and DTS. In these formats the voices are separately encoded in the center channel, and the rest of the channels are the background and soundtrack. Therefore, the center channel can be decoded and broken down to individual actor's lines for revoicing.

The text files associated with the individual audio files may be individual video files of the movie clip with the text superimposed onto the video image. In this embodiment, a video file with the corresponding text superimposed upon the image is provided along with each individual actor's audio file, and the respective video file is played along with the matching audio file whenever the user selects that particular actor for over-dubbing. Alternative methods of displaying the text are within the ready purview of those skilled in the art, and are all included within the scope of the invention as described herein. Other methods of dynamically superimposing caption text can be built into the software package. It would render the text using the timing code and annotations included in the text file.

The preferred embodiment of the invention entails the use of professionally prepared movie clips, wherein the end user is provided with a movie clip comprising the video file, the various individual audio files, and the associated text files. In an alternative embodiment, the system software of the invention may include functions that allow the user to select any video clip from any source and prepare the individual audio tracks and text files. The text may be encoded manually by the user, or alternatively voice recognition software may be included in the system software to extract text information from audio files.

The preferred embodiment of the invention comprises software executable on a computer such as a personal computer or Macintosh running the Windows or Macintosh operating system, respectively. However, any device capable of executing the software code may be employed with the invention, such as the Sony Playstation II and similar video game devices.

In another aspect of the invention, the system software will be available to users for purchase on various media, such as disks, cd's, or on-line via e-mail or the Internet. Similarly, movie clips comprising the necessary audio, video, and text files will also be available for purchase through various media. Thus, in one embodiment, a service provider may establish an Internet web site that users may log onto and electronically purchase any of a variety of movie clips. Such clips may be purchased by users for home entertainment purposes, or for use at public facilities such as bars, amusement parks and video arcades, charged on a per-use basis. To protect the intellectual properties of copyrighted material, security measures must be used when a video clip is distributed online. Specifically, watermark technology will be used to encode information about the owner of the downloaded material. To discourage illegal distribution, the user's personal information, such as name, address, and even credit card numbers, is strongly encrypted and then embedded in the video file, which can be recovered by the copyright holder if necessary. If piracy is suspected, the original buyer of the video can be recovered and traced, thus acting as a deterrent to broadly trade files with strangers. This method will not prevent sharing between family and friends, which should actually be encouraged. However, possibly only degraded or preview versions of the video could be redistributed by the users.

In case of an accidental key loss, such as harddisk crashes, the user simply has to provide the information used when purchasing the videos. However, if the information is lost, such as very old and long expired credit cards, the user will have the option of providing a new credit card number. If the new information is valid, the customer will not be charged and a new key will be issued using the old information from the server's database, so the video can be once again be unlocked. In the case of falsely reported key loss, this scenario is detected during the renewal process, when the rightful owner renews with the original information, which contradicts the new key. Therefore, the user who falsely reported the lost key will have to pay for past usage to receive a renewal.

To protect the user's privacy, all online transactions will be done through secured channels, such as SSL (secured socket layer), and strongly encrypted. To prevent possible hackers from recovering credit card numbers, the credit card numbers are encrypted using one-way ciphers and thus nonrecoverable. It is only necessary for the player to use the same cipher algorithm to encrypt and compare the encrypted credit card numbers, not the original information.

To prevent key theft, or "identity theft," user keys have to be renewed on a periodic basis with the server. This mechanism is for the users to update the information, such as address changes and credit card updates. During the renewal process, user information is verified, and a new encryption key is sent to the user. This key will be used to "unlock" the original video. Thus, in the event of a theft, the video/key pair will only work until the next retrieval period.

In another method of distributing movie clips to users, promotional clips may be freely distributed by movie studios to generate interest in newly released movies. Thus, in one embodiment, the service provider's web site may offer movie clips for sale as well as promotional movie clips free of charge. Promotional movie clips may not only be clips from newly released movies, but also television commercials featuring celebrities, music videos, variety show clips, classic news segments such as political speeches, etc. Depending upon the level of interest, some of these clips may be offered for sale. Promotional clips distributed by the service provider may be paid for by a fee charged to the promoter, either in the form of a flat fee or a fee based upon the number of times a particular promotional clip is downloaded by users accessing the service provider's web site.

In an alternative method of use of the invention, movies, news segments, variety shows, and other video files may be produced for use with the system software of the invention and distributed in this manner to end users. In a particular example, a television news segment may be recorded in English and distributed to local television stations in a format compatible with the system software of the invention. A Spanish language local station may then use the system software of the invention to dub over the English language commentary with the equivalent Spanish translation, and then broadcast the news segment to its local Spanish speaking viewing audience. Other similar post-production uses, including final film soundtrack editing, are also within the scope of the invention. In this manner, the invention would enable highly individual customization of video clips by end users for local, targeted distribution.

In another alternative method of use, the system software may be used to prepare video clips for electronic distribution as announcements, invitations, greetings, etc. Electronic greetings have become very popular, wherein an invitee receives an e-mail directing her to connect to a particular web site and view thereon the invitation or announcement that somebody has mailed to her, potentially along with advertisements and other promotional materials. Instead of displaying a static picture or a known movie clip, the present invention would allow users of the electronic greeting services to prepare a highly individualized video clip wherein their favorite actors or singers deliver their particular message. In this embodiment, the system software may be partially or fully resident on the electronic greetings web site, and downloaded on demand by the user. The web site may offer a variety of movie clips from which the user may select one to edit on his home computer, following which the edited video clip would be distributed from the web site to the recipients listed by the user. The cost of this service would be passed on to the advertisers displaying banners and other advertising material that is viewed by each recipient that signs onto the web site to view her invitation or announcement.

Alternatively, the greetings provider may e-mail the entire modified video clip to each recipient. In such case the video clip may have to be modified to require less memory and thus less transmission bandwidth, such as by decreasing the size of the video image or the color depth or both, or through the use of an appropriate compression algorithm. In such an embodiment, the cost of the service may be charged to the user who sends out the invitations, or to advertisers whose advertising messages may be automatically incorporated into the modified video clip or into the e-mail message that is sent to each recipient along with the video clip.

As mentioned above, the invention may be used for entertainment purposes in public venues such as bars or arcades. In one embodiment of such use, a booth may be provided containing the system 10 of the invention, wherein users may prepare custom video clips and e-mail them to various recipients for a fee.

Video compression technology has been steadily improving, with the current state-of-the-art MPEG 4 reducing the file size two to ten fold when compared to the current MPEG 2 standard used in the DVD format and the DSS satellite TV systems. Furthermore, bandwidth has been increasing quickly with cable modems, DSL, satellite, and optical networking becoming increasingly available. With the progression of reducing file size and increasing bandwidth, online video distribution becomes more viable with time. With available technologies today, short clips can be downloaded rapidly. Other options can be to set up download stations at physical locations, such as video rental stores, where removable storage can be used to download and store custom selections of clips.

Other features and uses of the system and method of the invention may include:

Distributing free versions of the player, downloadable through the Internet;

Enhanced versions for recording, plug-ins, works with existing DVDs;

Video games;

Sports newscasting;

Multi-user blind recording, simultaneous or sequential;

Imitating one or more actors in a film clip;

Imitating one or more singers in a music video;

Public competition/judging of best voice-overs;

Visual aids such as for lips shape/movement, tongue placement/movement;

Business presentations, such as annotation for commentary track for review and search of video clip Compression for distribution Online distribution (server/user), including:
1. requesting clips,
2. previewing version,
3. purchasing selected clips,
4. encrypting the clips with a watermark including buyer info
5. player extraction of encrypted info from watermark and comparison to buyer info on user's system (buyer's keys)—if the information matches, unlocking the film clips,
6. user sharing videos with friend—preview version is generated with watermark intact, and
7. friend receiving preview version, which can be played without the need for the original buyer's info—friend can then purchase full-quality video from server with their own info.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A method for customizing a motion film selection, comprising:

selecting a film clip including a video track and an original sound track comprising one or more actor voice tracks and a background track;

modifying the original sound track to remove a selected actor voice track;

recording a new voice track for synchronized playback with the selected actor; and saving a new sound track that is separate from the original soundtrack and that includes the modified sound track and the new voice track.

2. The method of claim 1, further comprising:

playing the video track together with the new sound track.

3. The method of claim 2, wherein playing the video track together with the new sound track comprises:

playing the video track together with the new sound track to synchronize the new voice track in the new sound track with the selected actor in the video track.

4. The method of claim 1, further comprising:

producing a new film clip by saving the video track together with the new soundtrack.

5. The method of claim 4, wherein saving the video track together with the new soundtrack comprises:

saving the video track and the new soundtrack with the new voice track in the new sound track synchronized to the selected actor in the video track.

6. The method of claim 4, further comprising:

playing the new film clip.

7. The method of claim 4, further comprising:

distributing the new film clip for playback.

8. The method of claim 1, wherein modifying the original sound track comprises:

modifying the original sound track to remove a plurality of selected actor voice tracks; and further comprising recording a new voice track for synchronized playback with each respective selected actor; and saving a new sound track including the modified sound track and the new voice tracks.

9. The method of claim 1, wherein recording a new voice track comprises:

recording a new voice track that is the same as the selected actor voice track.

10. The method of claim 1, wherein recording a new voice track comprises:

recording a new voice track that is different from the selected actor voice track.

11. A method for customizing a motion film selection, comprising:

selecting a film clip including a video track and an original sound track comprising a plurality of actor voice tracks and a background track;

modifying the original sound track to remove a plurality of selected actor voice tracks;

recording a new voice track for synchronized playback with each respective selected actor; and saving a new sound track that is separate from the original soundtrack and that includes the modified sound track and the new voice tracks.

12. The method of claim 11, further comprising:

playing the video track together with the new sound track.

13. The method of claim 12, wherein playing the video track together with the new sound track comprises:

playing the video track together with the new sound track to synchronize the new voice tracks in the new sound track with the respective selected actors in the video track.

14. The method of claim 11, further comprising:

producing a new film clip by saving the video track together with the new soundtrack.

15. The method of claim 14, wherein saving the video track together with the new soundtrack comprises:

saving the video track and the new soundtrack with the new voice tracks in the new sound track synchronized to the respective selected actors in the video track.

16. The method of claim 14, further comprising:
playing the new film clip.

17. The method of claim 14, further comprising:
distributing the new film clip for playback.

18. The method of claim 11, wherein recording new voice tracks comprises:
recording at least one new voice track that is the same as the respective selected actor voice track.

19. The method of claim 11, wherein recording new voice tracks comprises:
recording at least one new voice track that is different from the respective selected actor voice track.

20. A method for customizing a motion film selection, comprising:
selecting a film clip including a video track and an original sound track comprising one or more actor voice tracks and a background track;
selecting a modified sound track comprising the original sound track with a selected actor voice track removed therefrom;
recording a new voice track for synchronized playback with the selected actor; and
saving a new sound track that is separate from the original soundtrack and that includes the modified sound track and the new voice track.

21. The method of claim 20, further comprising:
playing the video track together with the new sound track.

22. The method of claim 21, wherein playing the video track together with the new sound track comprises:
playing the video track together with the new sound track to synchronize the new voice track in the new sound track with the selected actor in the video track.

23. The method of claim 20, further comprising:
producing a new film clip by saving the video track together with the new soundtrack.

24. The method of claim 23, wherein saving the video track together with the new soundtrack comprises:
saving the video track and the new soundtrack with the new voice track in the new sound track synchronized to the selected actor in the video track.

25. The method of claim 23, further comprising:
playing the new film clip.

26. The method of claim 23, further comprising:
distributing the new film clip for playback.

27. The method of claim 20, wherein selecting a modified sound track comprises:
selecting a modified sound track comprising the original sound track with a plurality of selected actor voice tracks removed therefrom; and further comprising
recording a new voice track for synchronized playback with each respective selected actor; and
saving a new sound track including the modified sound track and the new voice tracks.

28. The method of claim 20, wherein recording a new voice track comprises:
recording a new voice track that is the same as the selected actor voice track.

29. The method of claim 20, wherein recording a new voice track comprises:
recording a new voice track that is different from the selected actor voice track.

30. A method to enable customizing a motion film selection, comprising:
providing a film clip including a video track and an original sound track comprising one or more actor voice tracks and a background track;
providing a modified sound track comprising the original sound track with a selected actor voice track removed therefrom; and
providing a system for recording a new voice track for synchronized playback with the selected actor, the system further for saving a new sound track that is separate from the original soundtrack and that includes the modified sound track and the new voice track.

31. The method of claim 30, wherein providing a system further comprises:
providing a system for playing the video track together with the new sound track.

32. The method of claim 31, wherein providing a system for playing the video track together with the new sound track comprises:
providing a system for synchronizing the new voice track in the new sound track with the selected actor in the video track during playback.

33. The method of claim 30, wherein providing a system further comprises:
providing a system for saving the video track together with the new soundtrack to produce a new film clip.

34. The method of claim 33, wherein providing a system for saving the video track together with the new soundtrack comprises:
providing a system for saving the video track and the new soundtrack with the new voice track in the new sound track synchronized to the selected actor in the video track.

35. The method of claim 33, wherein providing a system further comprises:
providing a system for playing the new film clip.

36. The method of claim 33, wherein providing a system further comprises:
providing a system for distributing the new film clip for playback.

37. The method of claim 30, wherein providing a modified sound track comprises:
providing a modified sound track comprising the original sound track with a plurality of selected actor voice tracks removed therefrom; and providing a system further comprises
providing a system for recording a new voice track for synchronized playback with each respective selected actor, the system further for saving a new sound track including the modified sound track and the new voice tracks.

38. A system for customizing a motion film selection, comprising:
a film library for enabling selection of a film clip including a video track and an original sound track comprising one or more actor voice tracks and a background track;
a sound recorder connected to the library for removing a selected actor voice track from the original sound track and for recording a new voice track for synchronized playback with the selected actor; and
a storage device connected to the recorder for saving a new sound track that is separate from the original soundtrack and that includes the modified sound track and the new voice track.

39. The system of claim 38, wherein the library further comprises:
a library for selecting a modified sound track comprising the original sound track with the selected actor voice track removed therefrom.

40. The system of claims 38 or 39, further comprising:
a video player connected to the storage device for playing the video track together with the new sound track.

41. The system of claim 40, wherein the video player comprises:
a video player for playing the video track together with the new sound track to synchronize the new voice track in the new sound track with the selected actor in the video track.

42. The system of claims 38 or 39, wherein the storage device further comprises:
a storage device connected to the recorder for producing a new film clip by saving the video track together with the new soundtrack.

43. The system of claim 42, wherein the storage device for producing a new film clip comprises:
a storage device connected to the recorder for producing a new film clip by saving the video track and the new soundtrack with the new voice track in the new sound track synchronized to the selected actor in the video track.

44. The system of claim 42, wherein the video player comprises:
a video player for playing the new film clip.

45. The system of claims 38 or 39, wherein:
the sound recorder comprises a sound recorder for modifying the original sound track to remove a plurality of selected actor voice tracks and for recording a new voice track for synchronized playback with each respective selected actor; and
the storage device comprises a storage device connected to the sound recorder for saving a new sound track including the modified sound track and the new voice tracks.

* * * * *